Oct. 15, 1940.   C. W. PROCHASKA   2,218,481
CLAMPING DEVICE
Filed May 11, 1940
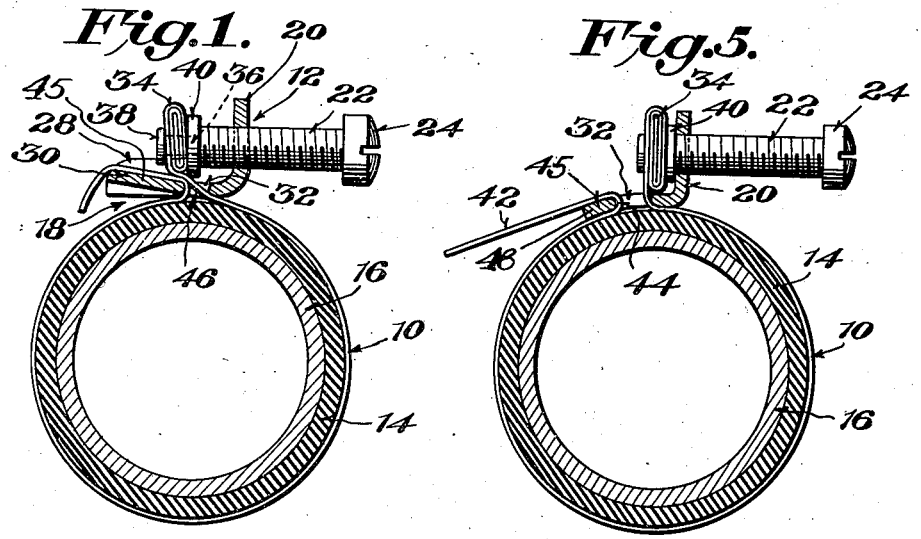
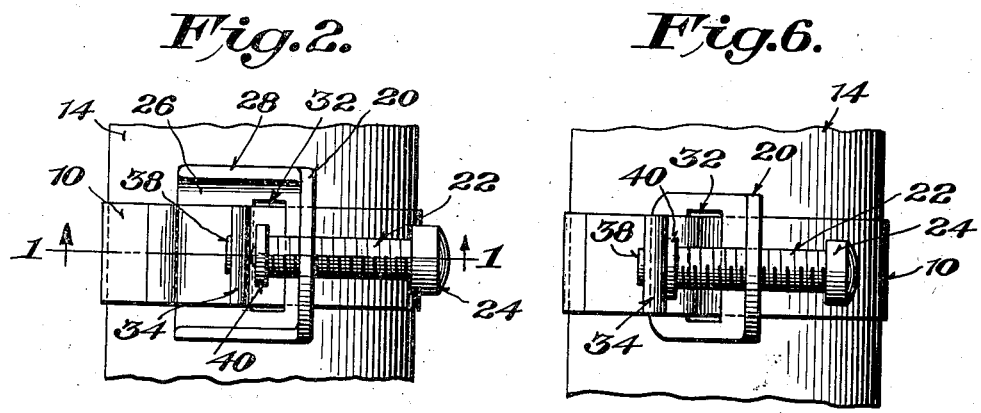
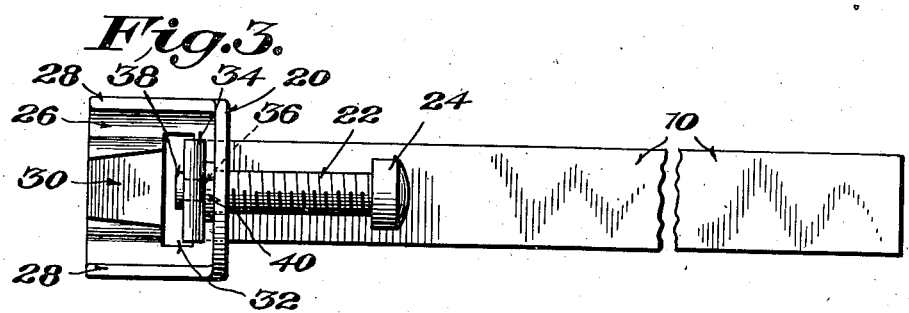
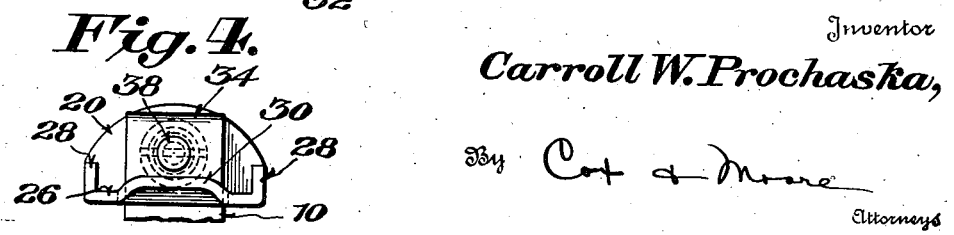
Inventor
Carroll W. Prochaska,
By Cox & Moore
Attorneys Patented Oct. 15, 1940

2,218,481

UNITED STATES PATENT OFFICE 2,218,481

CLAMPING DEVICE

Carroll W. Prochaska, Scarsdale, N. Y.

Application May 11, 1940, Serial No. 334,650

8 Claims. (Cl. 24—19)

The present invention relates to a clamping device and more particularly to a clamping unit adapted to apply an embracing pressure to a hose or the like.

The present invention contemplates yet more specifically a hose clamp comprising a strap or other elongated gripping member in combination with a frictional tensioning means acting adjacent the strap extremities for drawing the strap grippingly about the embraced member. It is an object of the present invention to provide a clamp construction of the foregoing type wherein the extremities of the elongated gripping element are frictionally engaged and caused to move under the influence of a tightening force in a direction to hold and shorten the gripping portion of the strap. To this end, the invention provides an abutment member about which one end of the strap is snubbed by a reverse bend while being disposed in position adapted to receive the opposite extremity of the locking portion in frictional engagement.

It is accordingly a further object of the present invention to provide locking devices as above wherein the snubbing abutment means is provided with a cooperating clamping surface in juxtaposition to an opposed frictionally gripping and clamping means mounted and arranged for forceful advancement across and substantially in the plane of the surface.

An important object of the present invention contemplates the disposition of the clamping surface at a slight angle of inclination with respect to the direction of clamping force for effecting a progressive increase in frictional gripping pressure during tightening.

It is an additional object of the invention to provide a hose clamp construction as above wherein the advanceable gripping means comprises a portion of the strap movable with the gripping means to tension the strap throughout its length.

It is important to note that the present invention comprehends the provision of a hose clamp capable of clamping engagement with hoses of widely varying diameter and operative to clampingly engage such a widely varying range of hoses with equal facility and efficiency. I have observed that, in the case of many opposed clamps with which I am familiar, maximum locking effectiveness is limited to a predetermined limited range of hose size, while in the case of those devices having a wider range of utility, the final tightening and clamping pressures being poorly distributed, tend to mutilate and tear portions of the strap.

It is accordingly an object of the present invention to provide a hose clamp as above comprising an embracing strap in combination with a tightening vise capable of frictionally and uniformly distributing clamping and holding pressures between opposite ends of the embracing portion of the strap and coincidentally operable to shift the said extremities circumferentially in strap tightening direction.

It is a further object of the present invention to provide a construction as above having a tightening unit engaging one end of the work embracing portion of the strap and forcefully shiftable to draw the strap about the work in combination with a cooperating clamping surface extending in the same general direction but disposed to support an opposed portion of the strap in position to be frictionally engaged and held by movement of the shiftable extremity. Thus, the present invention provides a clamping means of which one end of the strap is a part, movable generally longitudinally of an opposed clamping surface rigid therewith.

Among other objects of the present invention are to provide an improved movable clamping means adapted to resiliently engage opposed portions of the strap over their entire lateral width for urging these portions against the opposed clamping surface; more specifically, to provide a force applying and clamping pad comprising a plurality of resilient and/or flexible layers preferably formed from the material of the strap; to provide a frictional force applying member as above disposed in a generally diametrical plane and presenting a lateral marginal edge portion toward the clamping abutment; and to provide a construction such as the foregoing capable of distributing a tensioning and clamping pressure substantially normal to the said plane for holding the member in the diametrical position under the incidence of maximum tightening pressures.

Yet other and further objects will be apparent from a consideration of the following specification and drawing, wherein:

Figure 1 is a transverse sectional view taken centrally through a hose clamp constructed in accordance with the present invention and arranged upon a hose in operative position;

Figure 2 is a plan view of the hose clamp assembly shown in Figure 1;

Figure 3 is a plan view of the hose clamp of Figures 1 and 2 prior to application to the work;

Figure 4 is an end elevation of the hose clamp taken from the left hand extremity as viewed in Figure 3;

Figure 5 is a sectional view similar to Figure 1 but showing a modified form of clamp; and Figure 6 is a plan view of the hose clamp assembly of Figure 5.

Referring now to the figures of the drawing wherein there are shown detailed illustrative embodiments of the present invention, Figures 1 to 4 disclose a hose clamp comprising a strap 10 and a tightening unit 12.

The strap 10 comprises an elongated band of flexible preferably somewhat resilient material such as steel of uniform lateral width capable of being drawn forcefully about a hose such as that represented by the numeral 14 for clamping the hose upon the internal tubular support 16. The frictional clamping unit comprises a plate or bracket 18 including an upstanding flange 20 threadedly receiving the shank 22 of a machine screw 24. The bracket 18 has an integral laterally extending lower portion 26 projecting substantially at right angle to the flange 20 and provided at its side margin with integral upstanding strengthening ribs or flanges 28.

It is particularly important to note that the central portion of the lateral web 26 is bodily offset or deformed upwardly as at 30 into an inclined plane. In this connection, it is of further extreme importance to note that the inclined portion 30 provides a correspondingly inclined upper clamping surface making a slight angle with the axis of the machine screw 24. Since the clamping surface inclines toward the screw axis in its direction of approach to the clamping surface, it will be seen that this gripping surface tends to grippingly approach the extremity of the screw shank during its advance in work tightening direction.

Frictional clamping cooperation with the inclined surface is effected by means permanently mounted on the extremity of the screw shank 22 and comprising an extremity of the strap 10 extending through an aperture 32 in the plate 26. The said frictional means comprises a resilient pad or block 34 formed by reversely bending the end of the flexible strap upon itself a plurality of times. Thus, in accordance with the illustrative construction, it will be seen that the clamping member is formed of five layers disposed flatwise in parallel planes to provide a unit having a rectangular marginal periphery, the lower lateral margin of which is in parallel juxtaposition to the inclined clamping member 30. The clamping member 34 is permanently journaled upon the end of the screw shank 22 by means of a projecting pin 36 passing centrally therethrough and headed over at its outer extremity as at 38. It is important to note that a washer 40 disposed upon the pin 36 intermediate the shank extremity and the clamping pad 34 serves to uniformly distribute the axial tightening forces in a direction normal to the plane of the pad. In short, the washer 40 being of substantial area helps to maintain the frictional gripping unit 34 at a substantial angle to the inclined abutment surface 30.

From the foregoing, it will be apparent that prior to application to the work the parts of the hose clamp may be related as indicated in Figure 3; the strap 10 being of any suitable length and in a flexible form adapted to conveniently wrap about a hose. The operator accordingly proceeds to bring the strap about the hose 14 and to thread the extremity through the aperture 32, reversely about its margin and over the inclined portion 30.

Referring more particularly to Figure 5, which represents a modified but analogous embodiment at the foregoing stage of assembly, it will be seen that the free outwardly extending end of the strap, which I have designated by the reference numeral 42, extends in a direction substantially opposite or reversely with respect to the adjacent circumference of the hose embracing portion and accordingly may be manually tensioned to grippingly tighten the strap forcefully against the hose surface. To this end, I prefer to provide a material excess length of strap to facilitate manual engagement, which length may be cut off if desired at the conclusion of the clamping operation and as indicated in Figure 1.

It is important to note that the marginal edge portion 44 of the inclined clamping member 30 adjacent the aperture 32 provides an abutment surface 44 about which the end of the strap is snubbed. To facilitate engagement and subsequent manual tensioning of the strap, I prefer to round or curve the edges of the abutment edge 44 as clearly shown in the figures. This edge portion merges at one margin into the clamping surface 45 forming the upper surface of the clamping member 30.

With the parts initially manually tensioned as described, the threaded member 24 is now rotationally advanced to the left until the lower margin of the abutment pad 34 and the adjacent portions of the strap 10 are moved across the aperture 32 and into flatwise frictional engagement with the upper run or extension 42 of the opposite strap portions. As clearly shown in Figures 1 and 2, the upper strap portion laterally coincides with the opposite extremity of the strap which is wrapped about the abutment surface permitting frictional impingement throughout their entire lateral widths. Accordingly, both straps are gripped between the margin of the pad 34 and the fixed inclined plate or abutment 30.

It is of particular importance to note that the portions of the strap adjacent the affixed end, where they extend through the aperture 32 are distorted laterally out of a straight line by the marginal abutment edge 44. It will be understood by those skilled in the art that this lateral deformation results in the application of a lateral reactionary stress at a materially elevated mechanical advantage when the strap is tensioned longitudinally. Since the foregoing action results in fixed gripping of the lower strap section 42 where it extends about the underlying abutment, it will be evident that advancement of the screw shank results in a corresponding shiftable tensioning of the strap or band throughout its entire length.

From this point it will be apparent that, as the tightening element 24 progresses to shift the strap, tension is not only controllably increased to any desired degree but that the adjacent portions of the strap engage with progressively increasing frictional intensity. I have observed that the forceful advancement of the tensioning mechanism across the clamping surface 45 may operate to frictionally move the inner strap portion 42 in the same direction as the overlying strap portion to secure a dual tightening effect.

When assembled as above, the present hose clamp provides a permanent clamping connection applying uniform gripping force completely throughout the circumference of the hose and accordingly positively operative to prevent hose leakage. It is particularly significant to point out that the present clamp inherently functions to lock itself against unauthorized release even under severe vibration.

While in the foregoing embodiment I have disclosed a hose clamp having a frictional gripping surface or abutment inclined at an angle at about 10° with respect to the screw axis, this angle is at the same time variable, while being critical within certain limits. Thus, while the preferred angle of inclination disclosed more or less diagrammatically in Figure 1 represents the substantial maximum angle of inclination which I prefer to employ in order to secure the most desirable results, nevertheless, for many purposes the angular inclination may be increased to 11 or 12 degrees and extreme cases as much as 15 degrees. Maximum locking and tightening efficiency is generally available only when the disposition of the clamping surface is such that it forms with the screw axis an angle less than the foregoing.

I have shown in Figures 4 and 5 a slightly modified embodiment which indicates that the foregoing relatively inclined gripping surface, while desirable in securing the maximum advantages of the present invention, is not essential to the operation thereof in its broad aspect. Thus, it will be seen that in accordance with the present embodiment the laterally projecting abutment plate extends merely in a generally circumferential direction as at 48. In other words, in accordance with the broad aspect of the present invention the surface 45 need not be inclined toward the axis of the screw 22 in its direction of advance but as pointed out it may be so disposed that it merely extends in some direction which is generally or substantially the same as the direction of path of advance of the tensioning means 22. Advancement of the threaded member 24 from initial position to the work gripping position of Figure 6, accordingly, does not result in the same tendency for progressively increasing frictional engagement between the gripping member 34 and the opposed clamping abutment 44 and the instant clamping may accordingly be tightened to a degree limited only by the tension of the strap 10.

It is evident that the present invention provides an improved hose clamping capable of being rapidly installed to provide a permanent leak free joint with hoses of widely varying diameter. The present invention accordingly eliminates the necessity for providing a multiplicity of sizes, and functions to distribute the locking forces uniformly without the strap and associated parts. As a result it is significant to note that concentrated forces and strains such as often tend to mutilate and tear the strap can under no condition be set up in utilizing the present hose clamp.

It is obvious that various changes may be made in the foregoing specific embodiments shown only for purposes of illustration. The invention is not to be limited to the precise embodiments disclosed in the following claims.

The invention is hereby claimed as follows:

1. A clamping device of the class described comprising an elongated band having an abutment pad at one end, tensioning means connected with said pad and movable to shift said end of the band in a predetermined direction and gripping abutment means operatively connected with said tensioning means, said gripping abutment means being provided with a gripping surface extending in a direction inclined slightly with respect to the path of the tensioning means in its direction of movement, said abutment pad and said gripping surface being relatively movable in cooperative gripping relationship to grip an opposed portion of the band therebetween and said gripping surface being adapted to receive said opposed portion of the band thereabout in reversely extending relation.

2. A clamping device of the class described comprising an elongated band having an abutment pad at one end, tensioning means connected with said pad and movable to shift said end of the band in a predetermined direction and gripping abutment means operatively connected with said tensioning means, said gripping abutment means being provided with a gripping surface extending in a direction inclined slightly toward the path of the tensioning means in its direction of movement, said abutment pad and said gripping surface being relatively movable in cooperative gripping relationship to grip an opposed portion of the band therebetween and said gripping surface being adapted to receive said opposed portion of the band thereabout in reversely extending relation.

3. A clamping device of the class described comprising an elongated band having an abutment pad at one end, tensioning means connected with said pad and movable to shift said end of the band in a predetermined direction and gripping abutment means operatively connected with said tensioning means, said gripping abutment means being provided with a gripping surface extending in a direction inclined slightly with respect to the path of the tensioning means in its direction of movement, said abutment pad and said gripping surface being relatively movable in cooperative gripping relationship to grip an opposed portion of the band therebetween and said gripping surface being adapted to receive said opposed portion of the band thereabout in reversely extending relation, said abutment pad comprising a flexible yieldable member formed of a plurality of layers of said band disposed with flatwise relationship.

4. A clamping device of the class described comprising an elongated band having an abutment pad at one end, tensioning means connected with said pad and movable to shift said end of the band in a predetermined direction and gripping abutment means operatively connected with said tensioning means, said gripping abutment means being provided with a gripping surface extending in a direction inclined slightly with respect to the path of the tensioning means in its direction of movement, said abutment pad and said gripping surface being relatively movable in cooperative gripping relationship to grip an opposed portion of the band therebetween and said gripping surface being adapted to receive said opposed portion of the band thereabout in reversely extending relation, said abutment pad comprising a resilient member formed of a plurality of layers of said band by reversely bending the end portion of the band on itself a plurality of times and having a lateral marginal edge disposed in clamping juxtaposition to said gripping surface.

5. A clamping device of the class described comprising an elongated band having an abutment pad at one end, tensioning means connected with said pad and movable to shift said end of the band in a predetermined direction and gripping abutment means operatively connected with said tensioning means, said gripping abutment means being provided with a gripping surface extending in a direction generally the same with respect to the path of the tensioning means in its direction of movement, said abutment pad and said gripping surface being relatively movable in cooperative gripping relationship to grip an opposed portion of the band therebetween and said gripping surface being adapted to receive said opposed portion of the band thereabout in reversely extending relation, said abutment pad comprising a plurality of layers of resilient material disposed with a lateral marginal edge in clamping juxtaposition to said gripping surface.

6. A clamping device as claimed in claim 2 wherein said gripping surface makes an angle of about 10° with respect to the path of said tensioning means in its direction of movement.

7. A clamping device as claimed in claim 2 wherein said gripping surface makes an angle of less than 10° with respect to the path of said tensioning means in its direction of movement.

8. A clamping device as claimed in claim 2 wherein said gripping surface makes an angle of less than 15° with respect to the path of said tensioning means in its direction of movement.

CARROLL W. PROCHASKA.

CERTIFICATE OF CORRECTION.

Patent No. 2,218,481.                                October 15, 1940.

CARROLL W. PROCHASKA

It is hereby certified that error appears in the printed specification of the above numbered patent requiring correction as follows: Page 3, first column, line 5, for the word "unauthorized" read --authorized--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.